United States Patent [19]
Lortz et al.

[11] Patent Number: 6,041,364
[45] Date of Patent: *Mar. 21, 2000

[54] METHOD AND SYSTEM FOR ADDING A DEVICE ENTRY TO A DEVICE TREE UPON DETECTING THE CONNECTION OF A DEVICE

[75] Inventors: Victor Lortz; Stephen T. Chou, both of Beaverton, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/769,787

[22] Filed: Dec. 19, 1996

[51] Int. Cl.⁷ ..................................... G06F 13/10
[52] U.S. Cl. ............................. 709/301; 710/10
[58] Field of Search .................... 395/828, 829, 395/831; 709/301; 710/8, 10, 18, 104

[56] References Cited

U.S. PATENT DOCUMENTS

| | | | |
|---|---|---|---|
| 5,210,855 | 5/1993 | Bartol | 395/500 |
| 5,465,364 | 11/1995 | Lathrop et al. | 395/681 |
| 5,555,401 | 9/1996 | Allen et al. | 710/8 |
| 5,613,123 | 3/1997 | Tsang et al. | 713/1 |
| 5,630,076 | 5/1997 | Saulpaugh et al. | 710/104 |
| 5,655,148 | 8/1997 | Richman et al. | 395/828 |
| 5,675,831 | 10/1997 | Caputo | 395/830 |
| 5,732,282 | 3/1998 | Provino et al. | 710/10 |
| 5,740,436 | 4/1998 | Davis et al. | 395/651 |
| 5,794,032 | 8/1998 | Leyda | 713/2 |
| 5,797,031 | 8/1998 | Shapiro et al. | 710/8 |
| 5,802,365 | 9/1998 | Kathail et al. | 709/301 |
| 5,809,331 | 9/1998 | Staats et al. | 710/10 |
| 5,815,731 | 9/1998 | Doyle et al. | 710/10 |
| 5,852,743 | 12/1998 | Yeh | 710/18 |

OTHER PUBLICATIONS

"OLE Component Categories White Paper", ₁₃ Microsoft Corporation 1995, pp. 1–19.

*Primary Examiner*—Zarni Maung
*Assistant Examiner*—Andrew Caldwell
*Attorney, Agent, or Firm*—Charles A. Mirho

[57] ABSTRACT

A method and system for adding device entries to a device tree is disclosed. When the computer system detects the connection of a device, the computer system searches a device tree to determine if the device is being connected for the first time. If so, a device entry for the device, including a device type and at least one device function, is added to the device tree. Using the device type and at least one device function, the system searches a match tree to identify at least one first sequence of instructions to execute when the device is connected for the first time. The first sequence of instructions modifies the device entry to associate at least one software category with the device. The first sequence of instructions may: (1) modify the device entry to include at least one software component to be notified when the device is connected; and/or (2) modify the device entry to associate with each software category at least one software component to be used with the device.

11 Claims, 5 Drawing Sheets

DEVICE TREE

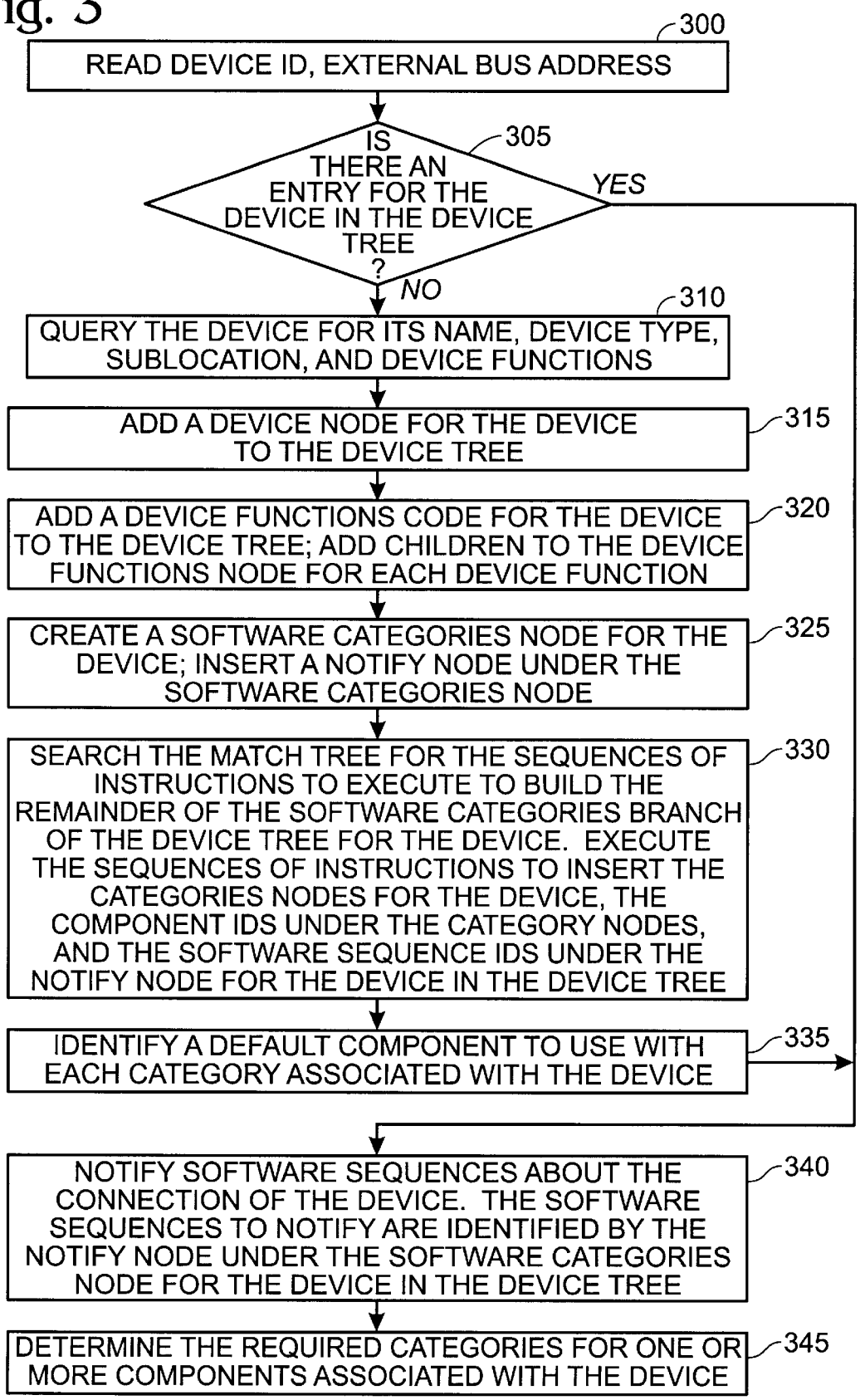

METHOD AND SYSTEM FOR ADDING A DEVICE ENTRY TO A DEVICE TREE UPON DETECTING THE CONNECTION OF A DEVICE

BACKGROUND

1. Field of the Invention

The invention relates to the field of computer software, and component-based computer software for devices in particular.

2. Art Background

Recent developments in technology have made it possible for consumer appliances, such as televisions, VCRs, and stereos, to communicate intelligently with computer devices, such as personal computers. Consumer appliances with this capability are sometimes called "smart devices" because of their ability to intelligently respond to commands and queries from the computer. The Consumer Electronic Bus (CEBus) technology standard IS-60/EIA-600, from the Electronics Industry Association, is an example of such a "smart device" technology.

Another technological development which is gaining in popularity is "component based software". A software component is a sequence of computer instructions implementing one or more categories of software functionality. Software components may be combined in a modular fashion to create more complicated programs. For example, a software component implementing a spell-checking category may be combined with a software component implementing a text-formatting category, to create a simple word processor program.

Software components should be able to 'advertise' the categories which they implement in some way, so that it is possible to know if they are useful to utilize in particular programs. Software components should also be able to advertise the software categories which must be present in other programs in order for them to carry out their functions properly. For example, the text-formatting component previously described may require a word-wrap category in order to format the text properly. This word-wrap category must be provided by the program which utilizes the text-formatting component in order for the text-formatting component to work properly.

It would be desirable to merge the technology of smart devices with the technology of component software to increase the ease and flexibility of creating programs to control smart devices when connected to personal computers. For example, the maker of a 'smart' television could create a software component which enables users to control and interact with the television by way of computers. Third party software providers could write programs which discover and utilize the television vendor's component automatically.

More generally, the television could be controlled by way of a generic television control program. Particular television models could then provide specific software components to control the models, these components being discovered and utilized by the generic television control program.

As computer users become more mobile, the probability of a device being connected and disconnected from the computer system increases. A laptop computer is an example of a portable device that is frequently connected and disconnected from different devices. At the office, the laptop computer may be connected to office equipment such as printers, networks, and faxes. At home, the laptop computer may be connected to televisions, modems, and stereos. The problem then arises; how can the capabilities of a smart device be detected when the device is connected to the computer for the first time, and how can the same device be later identified when it is disconnected and reinstalled a second time? It is also desirable to provide notification to software sequences on the computer system when devices associated with those sequences are connected. Referring to the television example presented above, the generic program for controlling televisions would desire notification when particular smart television models were connected to the computer system, so that the model-specific software component could be discovered and utilized by the generic television control program.

The features supported by a smart device are called device functions. To understand the difference between software categories and device functions, consider again the television example set forth above. The television has certain device functions, such as a tuner and a volume control. On the software side, a software component implements the 'television category', which consists of sequences of instructions to control the television tuner and volume control.

The Microsoft™ Corporation has defined a way for software components to advertise their implemented and required categories. A software component advertises its implemented categories using a data tree structure called the Registry. It also advertises in the Registry the software categories required for the component to perform its functions properly (refer back to the text-formatting component example).

The component advertises its implemented and required categories in the Registry using the tree structure of FIG. 1. FIG. 1 shows a computer-readable media, such as a hard drive or memory, storing a prior art data tree for identifying the implemented and required software categories for a software component. The media 120 is comprised of a data tree consisting of component nodes 102, 104, each component node having child nodes comprising an implemented categories node 106, 110, and a required categories node 108, 112. Each component node 102, 104 also comprises a TREAT AS node which identifies the default component to use for a particular software category. The implemented category nodes 106, 110 have a child node for each software category implemented by the component. Likewise, the required category nodes 108, 112 have a child node for each software category required by the component. By traversing the data tree on the media, a sequence of instructions executing on the computer processor can determine exactly which categories are implemented and required by any software component with an entry in the tree. The TREAT AS node identifies a component as the default component to use when a certain software category is required by a program.

The Microsoft data tree does not provide a way for associating smart devices with particular software components, device functions, or software categories. Nor does the Microsoft data tree provide a way of associating device functions with software categories, or for notifying software components when a device is connected to the computer system. It is therefore desirable to implement a computer readable media comprising data and sequences of instructions, said instructions which, when executed by the processor on a computer system, operate on the stored data to allow a device to be associated with software components, software categories, and device functions, and at the same time allow for associating device functions with software categories and providing for the notification of software sequences when a device is connected to the computer system.

SUMMARY OF THE INVENTION

A method and apparatus are presented which respond to the connection of a device to a computer system. The connection of the device to the computer system is detected, and a device tree is searched to determine if the device is being connected for the first time. When the device is being connected for the first time, a device entry for the device is added to the device tree. A device type and at least one device functions are associated with the device entry in the device tree. A match tree is searched using said device type and said device functions to identify at least one first sequence of instructions to execute when the device is connected for the first time, and said at least one first sequence of instructions is executed to associate with the device in the device tree at least one software categories.

BRIEF DESCRIPTION OF THE DRAWINGS

FIG. 3. illustrates a method for handling external devices which are connected to a computer system.

DETAILED DESCRIPTION

In the following description, numerous specific details are set forth such as circuits, flow diagrams, etc., in order to provide a thorough understanding of the present invention. In other instances, well-known structures and techniques have not been shown in detail because to do so may obscure the present invention. The specific arrangements and methods described herein are merely illustrative of the principles of the present invention. Numerous modifications in form and detail may be made by those of ordinary skill in the art without departing from the scope of the present invention.

The present invention involves the use of a computer-readable medium storing sequences of instructions for associating devices connected to a computer system with software components, software categories, and device functions. It also involves sequences of instructions for providing notification about the connection of a device. To accomplish these tasks, the sequences of instructions access two data structures—a Match Tree and a Device Tree.

Figure 2A:
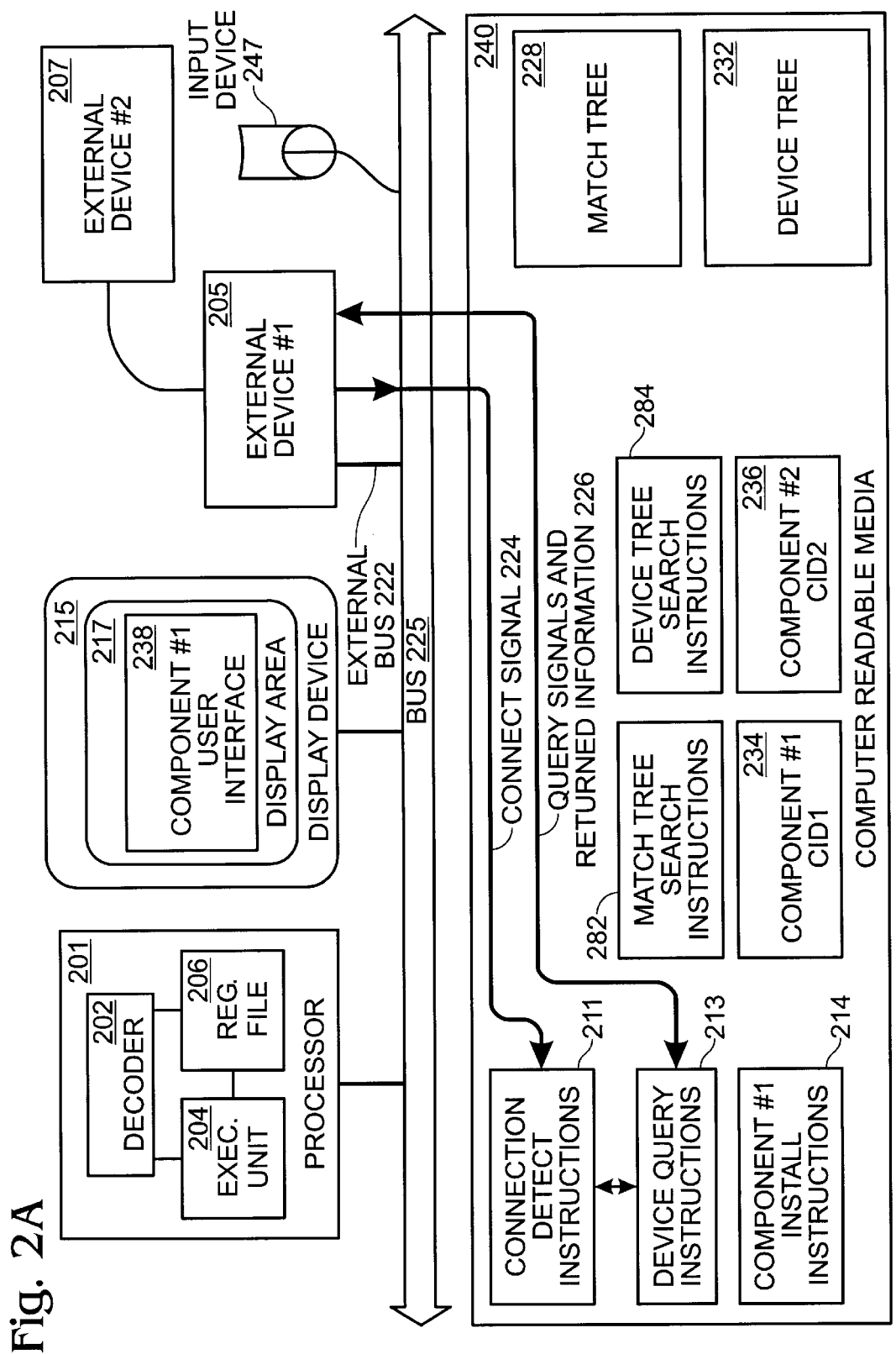
FIG. 2A. illustrates a computer system utilizing a computer readable media storing sequences of instructions for detecting the connection of a device, and utilizing a Match Tree and a Device Tree for installing the device and notifying software sequences of the connection of the device.

FIG. 2A illustrates a computer system utilizing a computer readable media 240 storing sequences of instructions for detecting the connection of a device, and utilizing a Match Tree 228 and a Device Tree 232 for installing the device and notifying software sequences of the connection of the device.

A computer-readable medium 240 stores sequences of instructions and data implementing the present invention. The computer-readable medium 240 represents one or more mechanisms for storing data. For example, the computer-readable medium 240 may include machine-readable mediums such as read only memory (ROM), random access memory (RAM), magnetic disk storage mediums, optical storage mediums, flash memory devices, and/or other machine-readable mediums. The computer-readable medium 240 is coupled to a processor 201 by way of a bus 225. The bus 225 represents one or more types of bus (e.g., Peripheral Component Interconnect (PCI) bus, Industry Standard Architecture (ISA) bus, X-Bus, Extended Industry Standard Architecture (EISA) bus, Video Electronics Standard Association (VESA) bus, optical coupling, etc.). The processor 201 represents a central processing unit of any type of architecture, such as Complex Instruction Set Computer (CISC), Reduced Instruction Set Computer (RISC), Very Long Instruction Word (VLIW), or a hybrid architecture. In addition, the processor 201 could be implemented on one or more chips. While this embodiment is described in relation to a single processor computer system, the invention could be implemented in a multi-processor computer system as well.

Using the bus 225, the processor 201 accesses the various elements stored in the computer-readable medium 240. The processor 201 contains a decoder 202 for decoding the sequences of instructions located on the computer readable medium 240, a register file 206 for storing the data operands located on the medium 240 and the results of executing the instructions, and an execution unit 204 for executing the instructions. Of course, the processor 201 contains additional circuitry which is not necessary to understanding the invention.

The decoder 202 is coupled to the bus 225, and the register file 206 is coupled to the decoder 202. The execution unit 204 is coupled to decoder 202 and the register file 206. In many cases, the operands of instructions decoded by the decoder 202 are made available to the execution unit 204 via the register file 206. The register file 206 contains data registers to store arguments for the received instructions. The processor 201 may contain status registers, control registers, and address registers for controlling the execution of the received instructions. The decoder may be implemented using hard-wired circuitry, a Programmable-Gate-Array, a microcoded ROM, or by any other method known in the art.

The processor 201 transfers the instructions and data stored by the media 240 over the bus 225 to the instruction decoder 202, where the instructions are decoded to determine their opcodes, operands, and other characteristics. Operands for the instructions and data stored by the media 240 may be included in the instructions and data stored by the media 240 (immediate operands), or they may be located as data stored by the computer-readable media 240, in which case the processor 201 may transfer the data from the computer readable media 240 to the register file 206. Or, the processor 201 may access the data operands for the instructions directly from the media 240. The decoded instructions are executed by the execution unit 204.

A display device 215 coupled to the bus 225 displays information to a user of the computer system. The display device can include a display memory, a cathode ray tube (CRT), or a flat panel display, among other technologies. The display device 215 includes a display area 217 for displaying a computer-generated image 238.

An input device 247 is coupled to the bus 225 and provides signals to the processor 201 in response to external events, such as movement of the device 247 over a surface to translate a mouse pointer on the display area 217 of the display device 215.

An external device 205 is coupled to the bus 225 by way of an external bus 222, and provides support for various device functions, such as tuning or volume control. A second external device 207 is coupled to the bus 225 by way of an external bus 222 and provides its own set of device functions. Note that in another embodiment, the external devices 205, 207 may not be physical devices at all, but may instead be sequences of software executing on the processor 201 of the computer system to emulate device functionality.

The computer readable media 240 stores the following elements: connection detect instructions 211, device query instructions 213, component install instructions 214, match tree search instructions 282, device tree search instructions 284, software components 234, 236, a Match Tree 228, and a Device Tree 232.

Figure 2B:
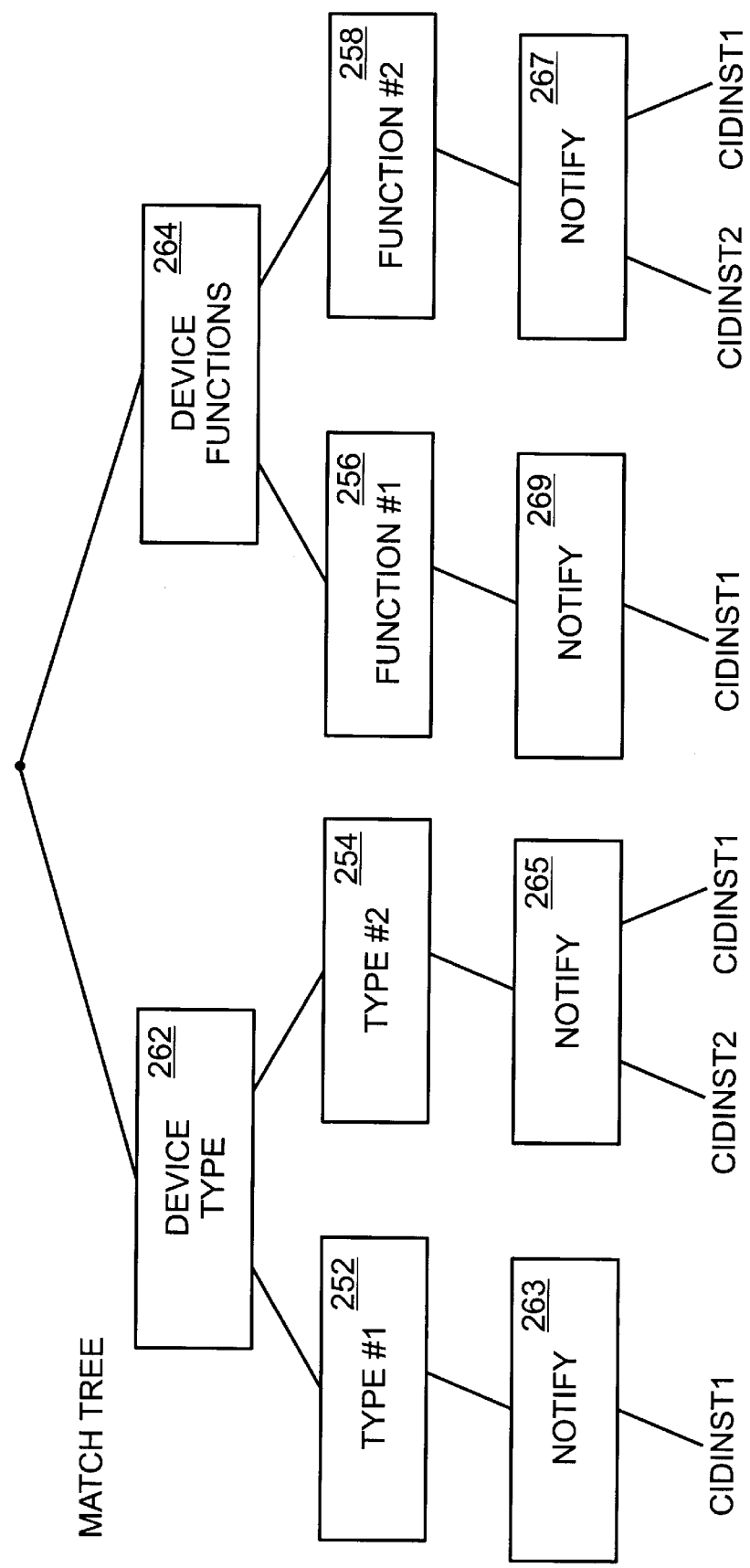
FIG. 2B. illustrates one embodiment of a Match Tree which may be utilized by the present invention.

Referring to FIG. 2B, the Match Tree 228 is comprised of a device type node 262, a device functions node 264, type nodes 252,254 and function nodes 256,258. Under each type node 252, 254 are notify nodes 263,265, and likewise under each function node 256,258 are notify nodes 267,269. In the device type branch of the tree, the children CIDINST1, CIDINST2 of the notify nodes 263,265 identify sequences of instructions to execute on the processor when a device of a particular type is connected to the system for the first time (see further explanation below). Likewise, in the device functions branch of the tree, the children CIDINST1, CIDINST2 of the notify nodes 263,265 identify sequences of instructions to execute on the processor when a device with particular device functions is connected to the system for the first time. The sequences of instructions identified under the notify nodes 263,265,267 are responsible for building the software categories branch of the Device Tree for newly connected devices, as explained further below.

Figure 2C:
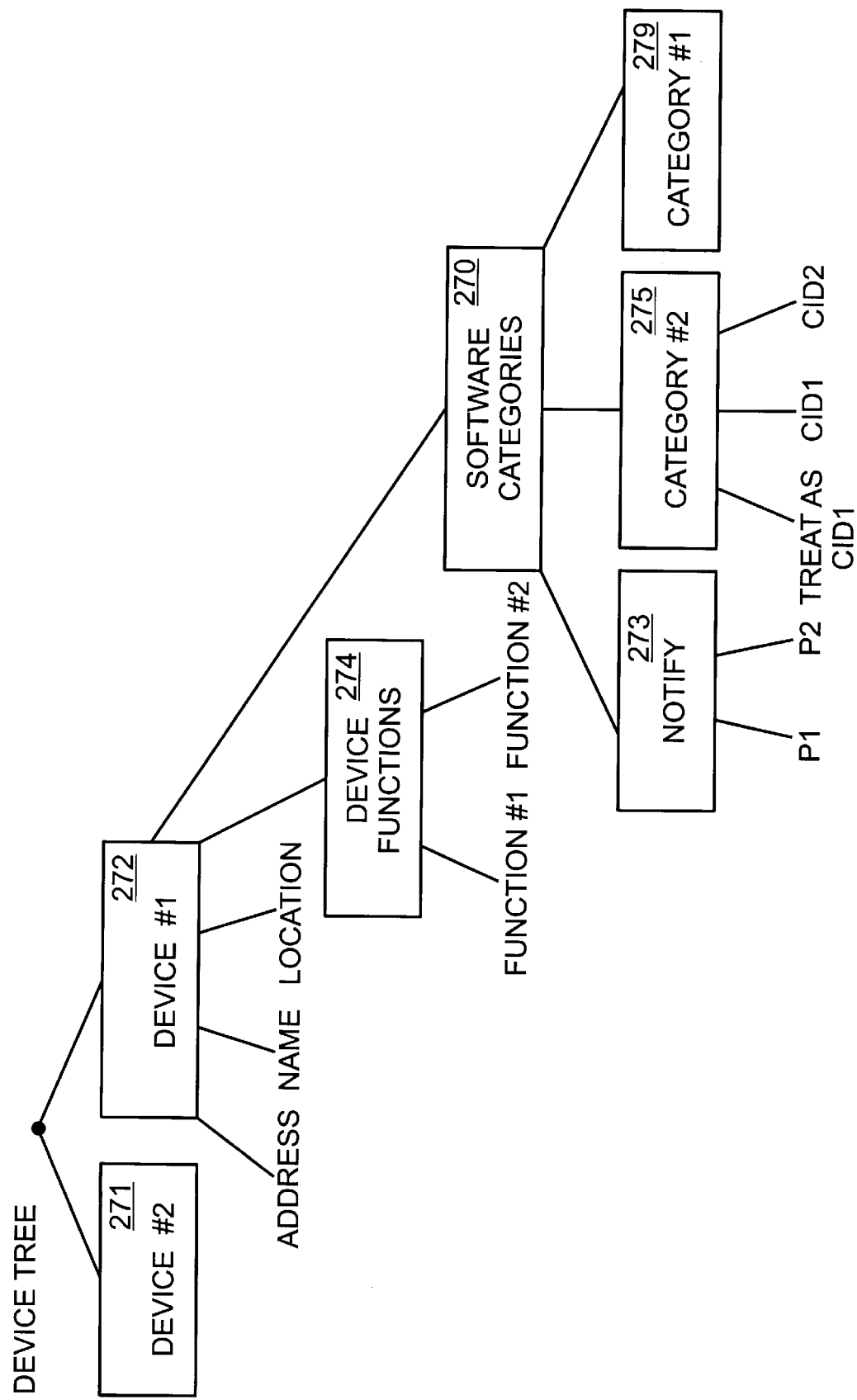
FIG. 2C. illustrates one embodiment of a Device Tree which may be utilized by the present invention.

Referring to FIG. 2C, the Device Tree 232 is comprised of one or more device nodes 271, 272, 277, each device node identifying a device which can be connected to the computer system. For the sake of clarity, only the details of one device node 272 are shown, although the details set forth would apply to all of the device nodes in the tree. The device node 272 has child nodes identifying the device name, address of the device on the external bus, and the location to which the device belongs (an example of a location is a home or office, or a room therein). Children of the device node 272 also include a device functions node 274. Each child of the device functions node 274 identifies a device function supported by the device (tuning, volume control, etc.). Another child of the device node 272 is the software categories node 270, under which are identified 1) the software sequences to notify when the device is connected, and 2) the software categories implemented by software components associated with the device. One child node of the software categories node 270 is a notify node 273. The children of this node identify which software sequences P1,P2 to notify when the device is connected to the system. When a software sequence is notified about the connection of a device, it can perform various device initializations, display information to the user, or carry out any task normally associated with the connection of a device.

Other children of the software categories node 270 are the specific category nodes 275, 279. Each category node identifies a software category associated with the device (refer to the television device example in the Background). Details are shown only for the category #2 node 275 in the figure, although such details apply equally to all category nodes.

The category node 275 has child nodes CID1, CID2 identifying the software components which implement the software category for the device. There is also a TREATAS child node identifying the default software component to use with the device for the software category.

In summary, the Device Tree contains information about devices which are, or have been, connected to the computer system. Not all of the devices with entries in the Device Tree may be connected to the computer system at any given time. A device is typically represented using the device serial number, although any unique identifier may be used. Each device has associated with it an address on the external bus, a device name, and a location (such as a particular room in the home where the device resides). Each device branch of the tree further branches into device functions for the device, and software categories for the device. The device functions are the features implemented by the device. The software categories are the software categories associated with the device. Zero or more software categories may be associated with each device. Furthermore, zero or more software sequences to notify when the device is connected may be associated with the device. For each software category associated with the device, a default software component implementing that category is identified. The list of device information provided by the Device Tree is in no way limited to the information described herein, which is merely illustrative of some of the possibilities.

To understand the interaction of the Match Tree and the Device Tree, consider what happens when an external device is connected to the system. Referring to FIG. 2A, the external device 205 generates the connect signal 224 when it is connected to the computer system. The sequence of connection detect instructions 211, when executed by the processor, causes the processor to detect the connect signal 224 from the external device 205. The sequence of device query instructions 213 is then typically executed by the processor 201, causing the processor to send query signals to the external device 205 and to receive back from the device returned device information 226, such as the device id and device type.

When a new external device 205 is connected (a new device is one which is being connected to the computer system for the first time), a device node 272 for the device 205 is added to the Device Tree 232. In one embodiment, the device node 272 for the new device 205 is added by the device tree search instructions 284. Information is retrieved from the device 205 such as the bus address, name, and location, and this information is associated with the device node 272 (either by creating child nodes of the device node, or perhaps by some other means, such as storing this information as attributes of the device node itself). The device functions associated with the device are also retrieved. A device functions node 274 is created under the device node 272, and each device function associated with the new device 205 is added as a child of the device functions node 274. A software categories node 270 is also created under the device node 272, and a notify node 273 is added as a child of the software categories node 270. At this stage, there are no category nodes 275, 279, and there are no children of the notify node 273. In one embodiment, the various nodes described above are added to the Device Tree 232 by one or more software sequences comprised by the device tree search instructions 284.

Devices connected for the first time have incomplete software categories branches in the Device Tree 232. The sequence of match tree search instructions 282 is executed by the processor 201, causing the processor 201 to search the Match Tree 228 for the sequences of instructions to execute when a device of the type of the connected device 205 is first connected, and also for the sequences of instructions to execute when devices supporting the device functions of the device 264 are first connected. The identified sequences of instructions CIDINST1, CIDINST2 are executed on the processor 201 to complete the software categories branch of the Device Tree 232. In one embodiment, the sequences of instructions CIDINST1,CIDINST2 to execute when the device is first connected are comprised by the component install instructions 214.

The identified sequence of instructions CIDINST1, CIDINST2 insert one or more specific category nodes 275,279 under the software categories 35 node 270 for the device 205. The identified sequence of instructions CIDINST1, CIDINST2 then insert, under the category nodes for the device, identifiers of the components CID1, CID2 which can be used with the device for that category. The identified sequence of instructions CIDINST1, CIDINST2 may also display a component user interface 238 on the display area 217 of the display device 215, in order to prompt for information about such things as which component to make the default TREATAS component for the device for a particular category.

As a final step in building the software categories branch of the Device Tree 232 for the device, the identified sequence of instructions CIDINST1, CIDINST2 install one or more identifiers P1,P2 under the notify node 273 for the device. These identifiers P1,P2 identify which sequences of instructions to notify when the device is connected to the system. These sequences of instructions are typically notified by executing them on the processor 201 and invoking a notification function within the sequences. In one embodiment, the sequences of instructions to notify PI,P2 are the software components CID1 234 and CID2 236 associated with the device.

Using the Device Tree 232, sequences of instructions stored on the computer-readable medium 240 (such as the device tree search instructions 284) can determine the device functions supported by a particular device, determine the devices supporting particular device functions, determine the software categories supported by a particular device, and determine the devices supporting a particular software category.

The Match Tree 228 is typically built as software components are installed on the system. When a software component 234, 236 is installed, an id is inserted in the Match Tree 228 under each notify node 263,265 for the device type and each notify node 267,269 for the device functions supported by the software component. Later, when a device of that type or supporting those device functions is first connected to the system, the sequences of instructions identified by the id are executed by the processor to build the software categories branch of the Device Tree 232 for the newly connected device. In the interests of efficiency, if the same sequence of instructions is identified both under a type node 252,254 and a function node 256,258 of the Match Tree 228, the sequence of instructions will only execute once when the device is newly connected, not multiple times.

To summarize, when a device is connected to the system the following sequence occurs:
1) The device signals the system and returns a device identifier.
2) The Device Tree is searched for a device with the returned identifier.
3) If the device identifier is not in the Device Tree:
   A) The device is queried for its location, device type, name, and device functions.
   B) A device node for the device is added to the Device Tree.
   C) A device functions node for the device is added to the Device Tree, with children representing the device functions.
   D) A software categories node is added for the device in the Device Tree.
   E) A Notify node is added under the software categories node.
   F) The Match Tree is searched to determine which sequences of instructions to execute to build the remainder of the software categories branch of the Device Tree for devices of this type or supporting these device functions. The identified sequences of instructions are executed to complete the software categories branch of the Device Tree for the device, by adding nodes for the software categories supported by the software components available for use with the device, by identifying those software components under the appropriate category node, and by adding under the Notify node the sequences of instructions to notify when the device is connected to the system.
4) All components that should be notified of the connection of this type of device are identified from the Notify node of the Device Tree, and notified.

The Match Tree 228 and the Device Tree 232 described herein represent one possible structure for these trees, but many other structures are possible which do not depart from the scope of the invention. For example, the device type node 262 of the Device Tree 232 could have under it children indicating sequences of instructions to execute upon the (first time) connection of any type of device. Likewise, the device functions node 264 could have under it children indicating sequences of instructions to execute upon the connection of a device supporting any device function.

Figure 1:
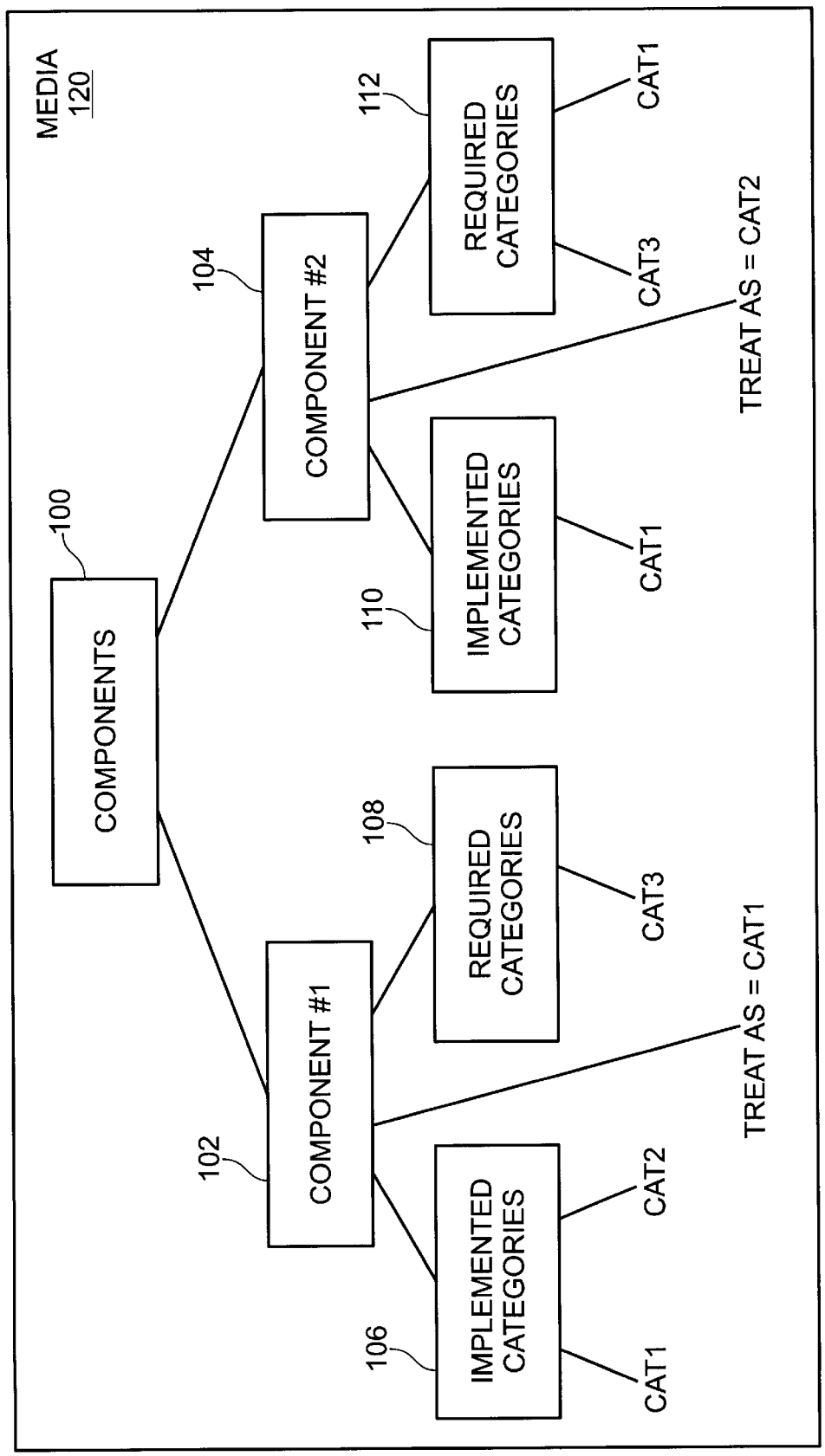
FIG. 1. shows a computer-readable media, such as a hard drive or memory, storing a prior art data tree for identifying the implemented and required software categories for a software component.

Once a software component to use with a device is identified from the Device Tree 232, the prior art tree of FIG. 1 may be used to determine the required software categories for the component.

In another embodiment, the device nodes 272 may have child nodes in addition to the ones identified in the figures.

FIG. 3 illustrates a method for handling external devices which are connected to a computer system. The method begins at step 300 by reading the id (typically, the serial number) and bus address of the connected device. At step 305 a check is made to determine whether or not there is already an entry for the device in the Device Tree. If there is no entry for the device in the Device Tree, the device is queried for its name, location, type, and supported device functions at step 310. After querying the device for name, location, type and supported device functions the next step is to add a device node for the device to the Device Tree at step 315. The name, location, and type may be stored as attributes of the device node, or else as children of the device node. A device functions node for the device is added to the Device Tree at step 320, with children representing the associated device functions. After adding the device functions node with children for supported device functions, the next step is to create a software categories node for the device in the Device Tree, and to insert a notify node under the software categories node. This is done at step 325.

At step 330, the Match Tree is searched to identify the software sequences to execute to build the remainder of the software categories branch of the Device Tree for the device.

The Match Tree is searched by the device type and the device functions of the connected device. All identified sequences are then executed, and these sequences insert category nodes in the Device Tree for the device, as well as identifying under the Notify node those software sequences to notify about connection of the device. One category node is created for each software category supported by software components that are associated with the device.

For each category node, zero or more software components are identified that implement that software category for the device. The next step at 335 is to associate a default software component with each category. The method then proceeds to step 340 (see below).

When the device is connected for the first time, it is necessary to build a branch for it in the Device Tree, as detailed above. However, if the device is not being connected for the first time, an entry will already exist for it in the Device Tree, and the method can proceed to step 340. At this step, the software sequences identified under the Notify node in the Device Tree are notified about the connection of the device. Finally, the required software categories for one or more of the software components associated the device are determined (perhaps using the prior art tree of FIG. 1) at step 345.

To summarize, the method of FIG. 3 operates as follows. First, the connection of a device is detected If the Device Tree does not already contain an entry for the device, the device is queried for certain information which is used to build a partial entry for the device in the Device Tree. Then the Match Tree is searched to identify the software sequences to execute to build the remainder of the software categories branch of the Device Tree for the device; specifically, the software categories and software components associated with the device are added to the Device Tree. Also, the software sequences to notify about connection of the device are identified under the Notify node of the Device Tree. A default software component to use for each associated software category is also added to the Device Tree.

Whether or not the device is being connected for the first time, the software sequences identified under the notify node in the Device Tree are notified about the connection of the device. Finally, the required software categories for the software components supported by the device may be identified, perhaps by searching the prior art tree of FIG. 1.

Although this invention has been shown in relation to a particular embodiment, it should not be considered so limited. Rather, the invention is limited only by the scope of the appended claims.

What is claimed is:

1. A method comprising:

detecting a connection of a device;

searching a device tree to determine if said device has been connected for the first time;

if said device has been connected for the first time, adding a device entry for said device to said device tree, associating with said device entry in said device tree a device type and at least one device function;

searching a match tree using said device type and said device function to identify at least one first sequence of instructions to execute when said device is connected for the first time; and executing said at least one first sequence of instructions to associate with said device in said device tree at least one software category.

2. The method of claim 1 further comprising:

associating with said device in said device tree, using said at least one first sequence of instructions when said device is connected for the first time, at least one second sequence of instructions to notify when said device is connected.

3. The method of claim 2 further comprising:

notifying said at least one second sequence of instructions of the connection of said device.

4. The method of claim 1 further comprising:

associating with each of said at least one software category in said device tree, using said at least one first sequence of instructions when said device has been connected for the first time, at least one software component to use with said device.

5. A medium readable by a processor having stored thereon:

a first sequence of instructions to detect a connection of a device;

a second sequence of instructions to search a device tree to determine if said device has been connected for the first time;

a third sequence of instructions to add a device entry for said device to said device tree, said third sequence of instructions further to associate with said device entry in said device tree a device type and at least one device function;

a fourth sequence of instructions to search a match tree using said device type and said device function to identify at least one fifth sequence of instructions to execute when said device is connected for the first time; and said fifth sequence of instructions to associate with said device in said device tree at least one software category.

6. The medium of claim 5, said at least one fifth sequence of instructions to associate with said device in said device tree, at least one sixth sequence of instructions, said at least one sixth sequence of instructions to be executed when connection of said device is detected.

7. The medium of claim 5, said at least one fifth sequence of instructions to associate with each of said at least one software category in said device tree, at least one software component to use with said device.

8. A computer system comprising:

a processor; and a storage area coupled to said processor, said storage area having stored therein sequences of instructions to respond to a connection of a device, said sequences:

detecting a connection of a device;

searching a device tree to determine if said device has been connected for the first time;

if said device has been connected for the first time, adding a device entry for said device to said device tree, associating with said device entry in said device tree a device type and at least one device function;

searching a match tree using said device type and said device function to identify at least one first sequence of instructions to execute when said device is connected for the first time; and executing said at least one first sequence of instructions to associate with said device in said device tree at least one software category.

9. The computer system of claim 8 in which said sequences of instructions further:

associate with said device in said device tree, using said at least one first sequence of instructions when said device is connected for the first time, at least one second sequence of instructions to notify when said device is connected.

10. The computer system of claim 8 in which said sequences of instructions further:

associate with each of said at least one software category in said device tree, using said at least one first sequence of instructions when said device has been connected for the first time, at least one software component to use with said device.

11. The computer system of claim 8 in which said sequences of instructions further:

notify said at least one second sequence of instructions of the connection of said device.

* * * * *

UNITED STATES PATENT AND TRADEMARK OFFICE
CERTIFICATE OF CORRECTION

PATENT NO.    : 6,041,364
DATED         : March 21, 2000
INVENTOR(S)   : Lortz et al.

It is certified that error appears in the above-identified patent and that said Letters Patent is hereby corrected as shown below:

Column 7,
Line 14, delete "35".

Signed and Sealed this

Fifth Day of March, 2002

Attest:

Attesting Officer

JAMES E. ROGAN
Director of the United States Patent and Trademark Office